US006260762B1

(12) United States Patent
Lohmann

(10) Patent No.: US 6,260,762 B1
(45) Date of Patent: Jul. 17, 2001

(54) METHOD FOR CODING MAILING ITEMS

(75) Inventor: Boris Lohmann, Bremen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/308,413

(22) PCT Filed: Nov. 7, 1997

(86) PCT No.: PCT/DE97/02608

§ 371 Date: Jul. 14, 1999

§ 102(e) Date: Jul. 14, 1999

(87) PCT Pub. No.: WO98/22229

PCT Pub. Date: May 28, 1998

(30) Foreign Application Priority Data

Nov. 20, 1996 (DE) ............................................. 196 48 005

(51) Int. Cl.[7] .............................. G06K 5/04; G06K 7/10; G06K 9/32

(52) U.S. Cl. ................................ 235/462.08; 235/462.13

(58) Field of Search .................................... 235/375, 494, 235/462, 462.13, 462.01, 462.08, 462.09, 462.15; 209/584

(56) References Cited

U.S. PATENT DOCUMENTS 4,757,189 7/1988 Daboub .
4,868,757 * 9/1989 Gil ................................. 364/464.03
4,992,649 * 2/1991 Mampe et al. ........................ 235/462
5,073,954 * 12/1991 Van Tyne et al. ..................... 382/18
5,270,522 * 12/1993 Bone, Jr. .................................. 235/1
5,278,947 * 1/1994 Balga, Jr. et al. ................... 395/117
5,311,597 * 5/1994 Rosenbaum .............................. 382/1
5,387,783 * 2/1995 Mihm et al. .......................... 235/375
5,420,403 * 5/1995 Allum et al. .......................... 235/375
5,428,211 * 6/1995 Zheng et al. .......................... 235/462
5,431,288 * 7/1995 Nishijima et al. ................... 209/584
5,514,863 * 5/1996 Williams .............................. 235/494
5,635,694 * 6/1997 Tuhro ................................... 235/375
5,697,504 * 12/1997 Hiramatsu et al. .................. 209/546
5,754,671 * 5/1998 Higgins et al. ...................... 382/101
5,805,710 * 9/1998 Higgins et al. ...................... 382/101
5,910,998 * 6/1999 Yui ...................................... 382/101
5,984,174 * 11/1999 Kato et al. .......................... 235/375

FOREIGN PATENT DOCUMENTS 0 282 359 9/1988 (EP) .
2 654 650 5/1991 (EP) .

* cited by examiner

*Primary Examiner*—Karl D. Frech
(74) *Attorney, Agent, or Firm*—Venable; Robert Kinberg

(57) ABSTRACT

A method for coding mailing items, in which a determination of the surface available for applying an unambiguous code to arriving mailing items is conducted and an application of the unambiguous code with a number of code signs that is adapted to the respectively determined surface available for coding is performed.

3 Claims, 1 Drawing Sheet

METHOD FOR CODING MAILING ITEMS

BACKGROUND OF THE INVENTION

The invention relates to a method for coding mailing items by means of applied, readable code signs. Information is nowadays applied by machine to mailing items during the automatic processing. This can occur by printing on a barcode (or other code) or by printing on clear text.

The printed-on information can:

Contain target information, meaning information on the recipient of the mail item, which is used, for example, for sorting;

Contain an identification of the mail item, so that a later recognition is possible. Such an identification is frequently called an identification code (ID code) and is necessary, for example, for the offline processing;

Contain information on the sender;

Contain statistical and other information.

Combinations of two or more of the aforementioned types of information are also standard. Frequently, additional, redundant information is applied to reduce the risk of reading errors. At the same time, the printing technique and the reading technique must be as simple and inexpensive as possible, while the reading safety must be as high as possible. At the present time, the method that is easiest to use and at the same time relatively secure when using bar codes is the single-space printing of a fluorescent bar/no-bar code with a bar spacing of, for example, 1.5 mm.

The coding as well as the number of coded signs and the spacing between coded signs have until now been determined in that the codes, particularly the identification codes, for the most frequent mailing items with higher standard size are unambiguous and, if possible, fill the space provided for it.

If the mailing items also include items with a length shorter than the standard length, it can happen that the available space for the ID code may no longer be sufficient when maintaining the agreed-upon spacing between code signs. However reducing the size of the code signs and the spacing would result in higher reading and printing expenses as well as a reduction in the reading safety.

It is therefore the object of the invention specified in claim 1 to clearly code mailing items of varied size by maintaining the size and spacing between the coded signs selected for large mailing items.

It is possible to maintain the original size and the spacing between code signs despite the fact that the mailing items are smaller by measuring the area available for applying the code on the arriving mailing items, as well as by selecting and subsequently applying an unambiguous code with a code sign number that is adapted to the respectively determined surface for coding.

Several different methods can be used to determine the dimensions available for coding. Thus, the area not printed on and its dimensions are determined during the optical scanning of the surface of the mailing item at the agreed-upon location. In many cases, it is sufficient to determine or simply measure the length of the mailing item and reduce it by a fixed amount.

It is advantageous to reduce the existing redundant information in order to reduce the number of digits for an ID code. With smaller and in particular shorter items, which therefore have a reduced number of code signs, it is possible to check whether the ID code is unambiguous by keeping a statistic on the frequency of different lengths for items processed so far, which are available for the ID code and effect the number of signs to be applied. The unambiguous condition exists if for the observed time interval all accumulated mailing items with the ID code number adapted to the length can be clearly distinguished.

The invention is explained in the following with the aid of a drawing and exemplary embodiments.

DETAILED DESCRIPTION OF THE INVENTION

EXAMPLE 1 FOR SHORTENING THE ID CODE

Figure 1:
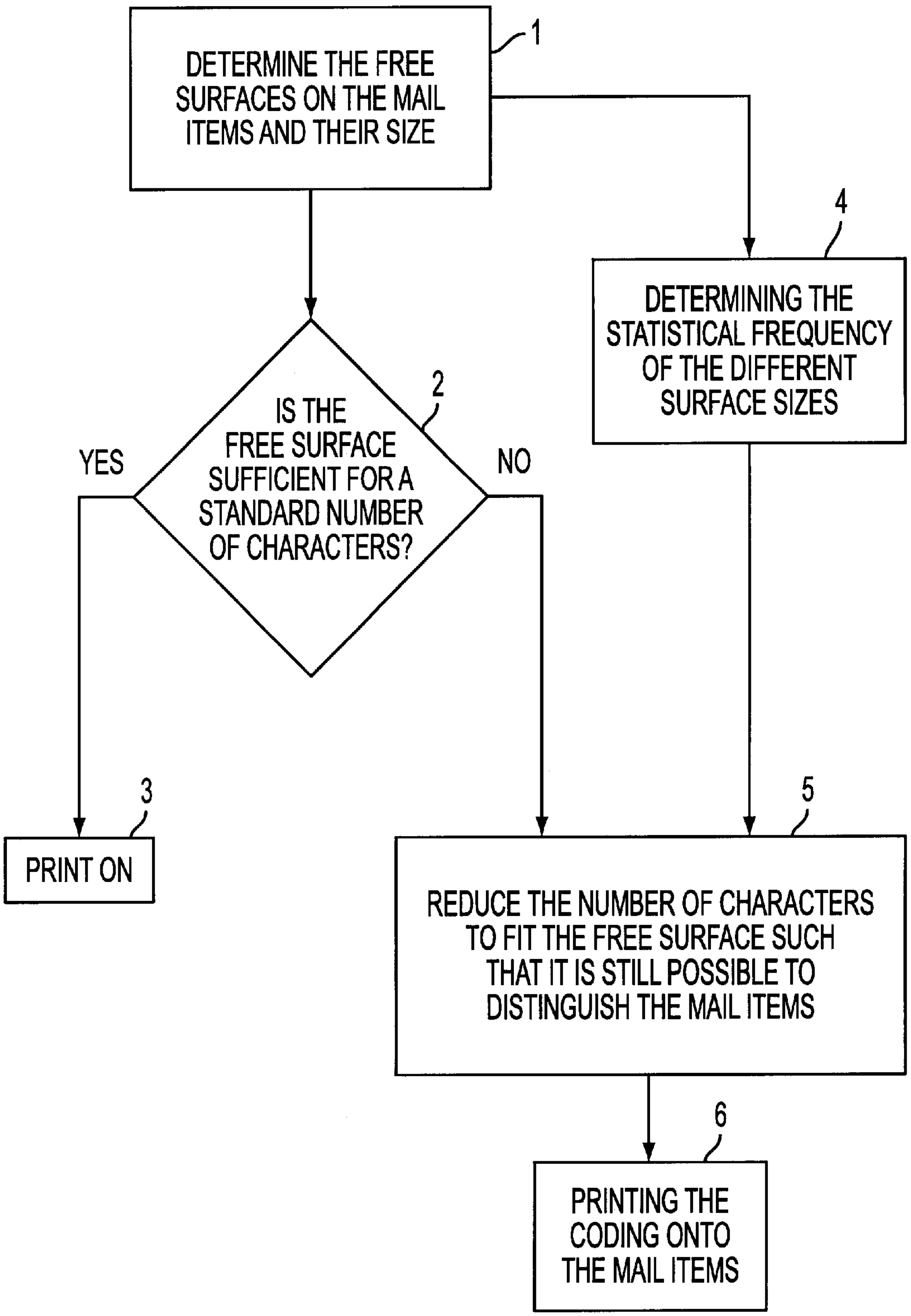
FIG. 1 illustrates a flow chart for the steps of the invention.

A 10-digit decimal number is to be printed on in clear text as unambiguous code sign for the mailing item, so that daily 100 million items can be distinguished unambiguously over a period of 100 days. Based on statistical surveys, it is known that 3% of the items are too short to accommodate 10 digits, but are long enough to have 9 digits printed on. The supply of $10^{10}$ code sign sequences that can be differentiated contains not only 10-digit numbers, but also shorter ones, namely $10^9$nine-digit $+10^8$eight-digit

+. . .

code sequences (a leading zero does not have to be printed in the decimal system).

Based on this, up to 11.1% of the items can be provided with codes that are shorter than the 10-digit code signs. This share is higher than 3%, meaning all items that appear can be coded unambiguously, without losing unambiguousness and without other disadvantages.

EXAMPLE 2 FOR SHORTENING ID CODES

The information to be printed is to be printed in the bar/no-bar technique and is to consist of 40 bits of target information and 40 bits of ID code. With the understanding that a printed bar means a binary "one" and an omitted bar a binary "zero," the available store of $2^{40}$ code sign sequences contains:

$2^{39}$ sequences with a length of 39 bars, $2^{38}$ sequences with a length of 38 bars, etc.

If only 75 instead of 80 bars can be applied to short items, for example, more than 3% of the code sign sequences ($2^{35}/2^{40}$=0.031) are still available for these cases.

EXAMPLE 3 FOR SHORTENING OPTIONAL CODES PROVIDED WITH REDUNDANCY

In order to reduce errors, redundancy codes are added to the information to be printed. Three optional methods are available for this. The total number of printable code sign sequences thus is composed of three partial segments of code sign sequences of varied length. Depending on the length of the measured mailing item, a code sign sequence is selected from the partial segment that can just barely be printed on the available space.

EXAMPLE 4 FOR SHORTENING WITH THE AID OF DIFFERENT TYPES OF CODING

Normally, the code to be applied must represent an information present as decimal number. It is favorable if the code can be deciphered easily by humans with the aid of a small template. When using the bar-no-bar technique, it suggests itself to use a group of four bars for each position of the decimal number, which is then easily decipherable with a 10-line table. If the 4-state bar technique is used, each decimal place can be represented by two bars. A 3-digit decimal number requires therefore 3*4=12 bars in the bar-no-bar technique or 3*2=6 bars in the 4-state technique. The number of bars and thus the required printing length on the mailing item can be reduced by changing to a binary coding at the cost of easy decipherability for humans. For the binary representation, it is sufficient to have 10 bars in the bar-no-bar technique or 5 bars in the 4-state bar technique to show each 3-digit decimal number because $2^{10}>1000$ and $4^5>1000$. The same applies if text is coded in place of decimal numbers. As illustrated in FIG. 1, initially, a determination of the surface available for applying the unambiguous code to the arriving mailing items is made 1. A statistic is kept on the frequency of varied the lengths of available codes dependent from the ID codes of mailing items processed until now during a fixed time period 4. Following this, it is determined whether the free surface is sufficiently large for the normal, standard number of characters, given the standard character size 2. If this is the case, a corresponding code is printed on 3. If the surface is too small, the code length is adapted to fit the determined print area 5, by taking into consideration the number of mail items that must be differentiated according to the statistic determined in step 4. Subsequently, this coding is printed on the mail item 6.

What is claimed is:

1. A method for coding mailing items, comprising the following steps:

a) determining the surface area available for applying an unambiguous code to arriving mailing items; and b) applying the unambiguous code with a number of code signs, the number being adapted to the respectively determined surface area available for applying the coding.

2. A method according to claim 1, further comprising the steps of:

adapting a number of redundancy signs contained in the code to the respectively determined surface available for coding.

3. A method according to claim 1, further comprising the steps of:

testing the unambiguousness of a selected identification code (ID code);

storing a statistic on the frequency of varied lengths of the remaining available codes dependent on the ID codes of mailing items processed during a fixed time period, which affects the number of code signs in the ID code to be applied;

determining whether all the mailing items that have accumulated during the fixed time period with an ID code can be distinguished clearly.

* * * * *